March 11, 1941.  W. N. PARKER  2,234,875
MODULATING SYSTEM
Filed Jan. 21, 1939  3 Sheets-Sheet 1

Inventor:—
William N. Parker
By his Attorneys
Howson & Howson

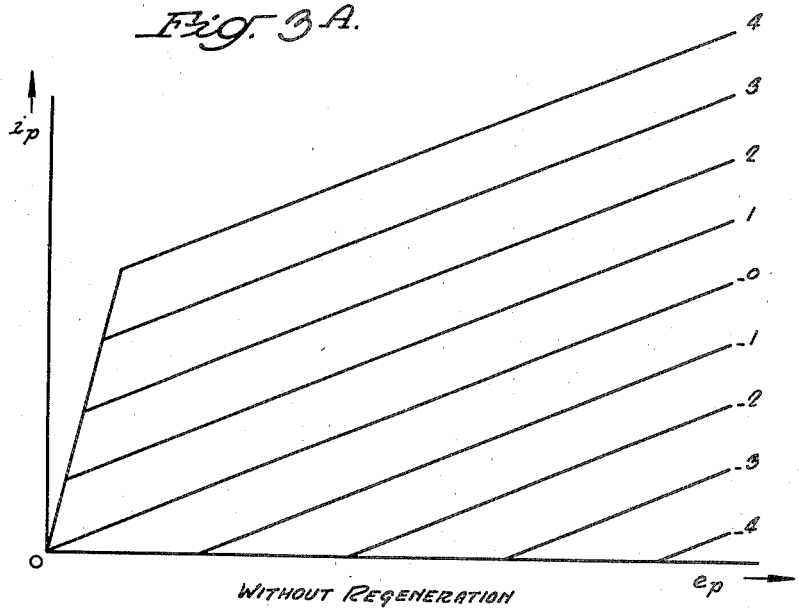
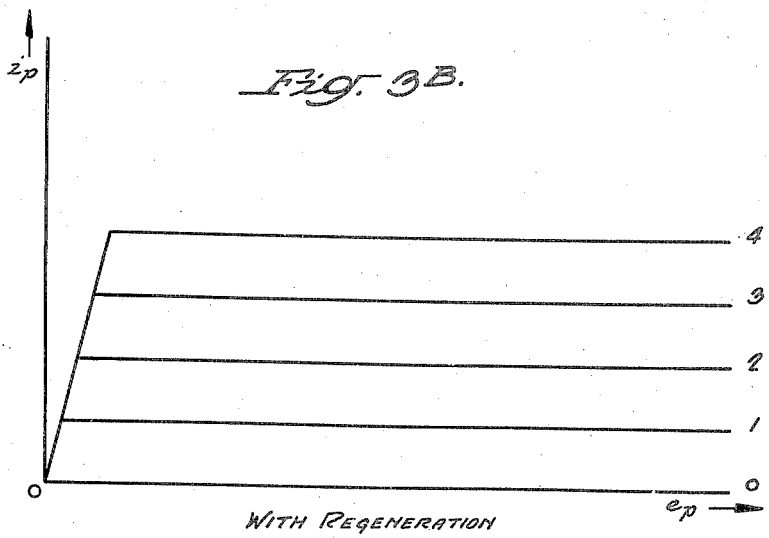

Patented Mar. 11, 1941

2,234,875

UNITED STATES PATENT OFFICE 2,234,875

MODULATING SYSTEM

William Nelson Parker, Philadelphia, Pa., assignor, by mesne assignments, to Philco Radio and Television Corporation, Philadelphia, Pa., a corporation of Delaware Application January 21, 1939, Serial No. 252,204

7 Claims. (Cl. 179—171.5)

This invention relates to improvements in modulating systems, such as those used to generate modulated carrier waves used in radio and television transmission, and in particular to modulating systems which operate on the principle of absorbing energy in order to generate the modulated wave such, for example, as the system disclosed in my application, Serial No. 84,534, filed June 10, 1936 for a "Modulating system" of which this application is a continuation in part.

The present invention relates particularly to the energy absorbing means and its associated apparatus and, when the features herein described are incorporated in my aforementioned modulating system, a number of desired results obtain which will be described hereinafter in detail. However, although these methods are described with reference to their application to a particular modulating system, it will be understood that they are equally applicable to other modulating systems and to energy absorption means in general.

One object of the present invention is to provide a controllable energy absorbing device in which the relation between the amount of energy absorbed and the magnitude of the control signal is more nearly linear than in previous systems of this type.

Another object of the invention is to provide a controllable dissipator of energy requiring a minimum of variation in control signal voltage to obtain the desired variation in its resistance which, for a given voltage impressed upon it or for a given current supplied to it, determines the amount of energy dissipated.

A further object of the invention is to provide a controllable energy dissipator which absorbs a minimum of energy from the source of control signal and which has, at the same time, good frequency response over a wide range of frequencies.

A still further object of the invention is to provide a controllable energy dissipating device which presents an impedance to the device from which it is to absorb energy, which is substantially purely resistive.

Still another object of the invention is to provide a controllable energy dissipator for use in a modulating system which is capable of generating an amplitude-modulated wave substantially free from frequency modulation.

Other objects and features of the invention will be apparent from the following description and the accompanying drawings in which:

Figs. 3A and 3B show respectively an unmodified "plate family" of one of the modulating tubes and the "plate family" for the same tube modified according to the method of the invention;

Figures 2, 5:
Fig. 2 is an explanatory diagram showing the manner in which the static plate characteristic of the modulating tube is altered according to the method of the invention.
Figure 4A:
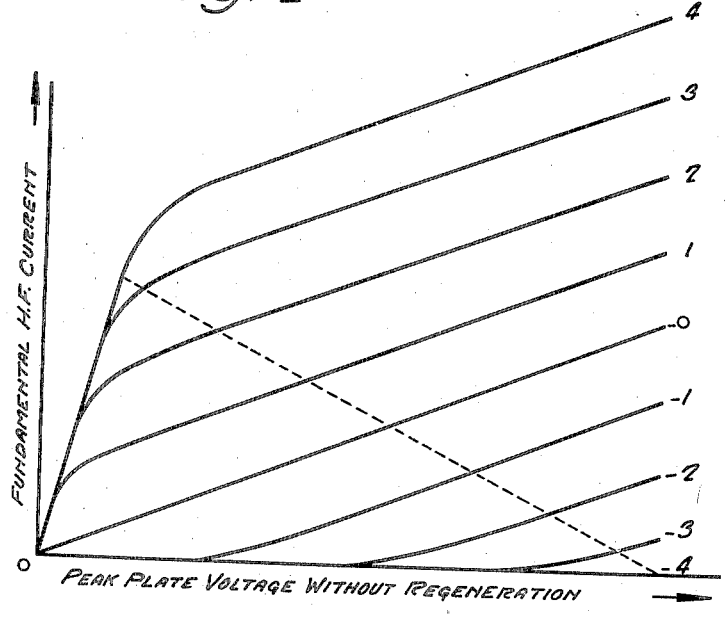
Figure 4B:
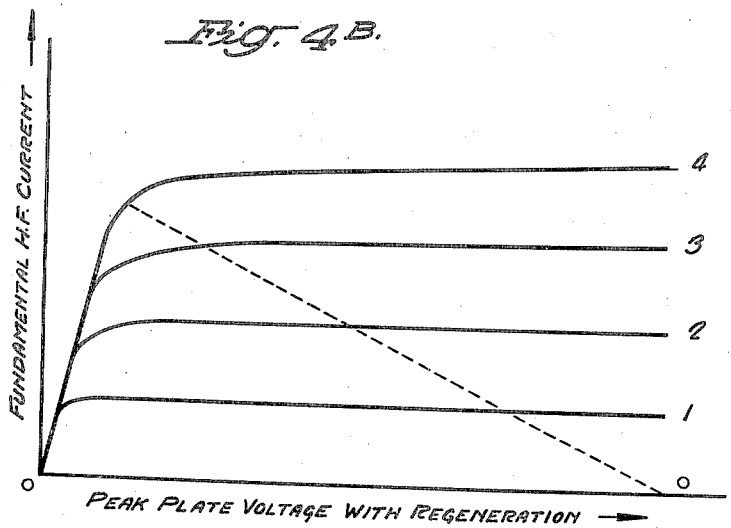

Figs. 4A and 4B show respectively for the unmodified tube and for the modified tube, the relation of the fundamental component of A. C. plate current to the maximum A. C. plate voltage and A. C. plus D. C. grid voltage, as derived from the curves of Figs. 3A and 3B in the manner to be described later in this specification; and Fig. 5 shows the relation between the fundamental component of plate current and the total instantaneous grid voltage for both the unmodified and the modified tube as derived from the curves of Fig. 4.

Figure 1:
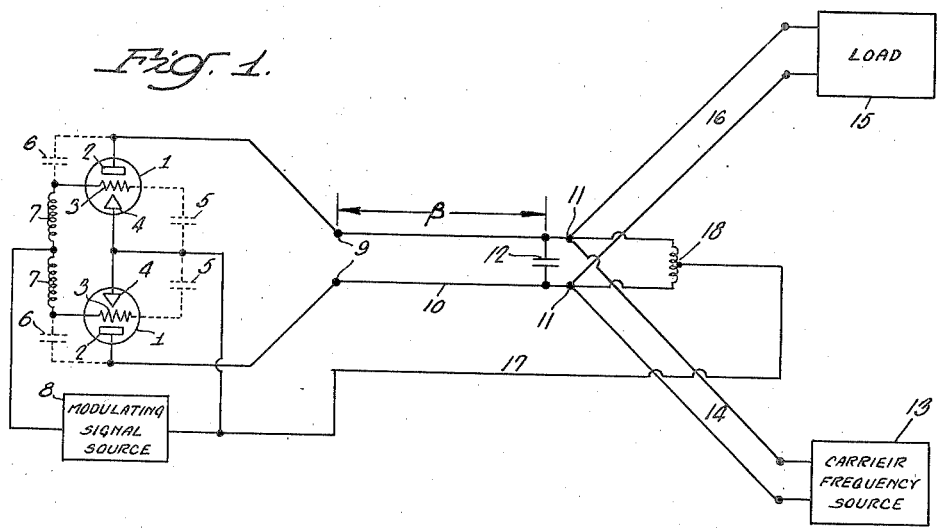
Fig. 1 is a schematic illustration of a preferred embodiment of the invention.

In Fig. 1 there is shown the circuit diagram of a device employing one embodiment of the invention, which may be used to modulate a high frequency carrier signal of the type employed in the television art with a modulating signal which may have been obtained from a television camera, and which may include the usual synchronizing signals and other signals employed in the transmission of television pictures. Disregarding for the moment those improvements which have been incorporated in the circuit and which constitute the subject matter of my present invention, the circuit is the same as that described in my above-mentioned prior application. It will be understood, of course, that the invention is not limited to the particular use in conjunction with the specific circuits herein shown and described but may be generally applied to a wide variety of systems used in the modulation of one wave signal by another.

The portions of the circuit represented in block form and designated, respectively, "modulating signal source," "load," and "carrier frequency source," may taken any suitable form, such as illustrated in the above-mentioned prior application. For the present purpose, it is only necessary to illustrate in detail that portion of the complete modulating system which is regarded in my said prior application as a controllably variable impedance, and which further may be regarded as a generator of the side-band component of the complete modulated wave. In the embodiment, as shown in Fig. 1, this portion of the circuit may comprise the pair of modulating tubes 1 each comprising a plate 2, a grid or control element 3, and a cathode 4. The capacitances 5 and 6, indicated by broken lines, represent respectively the grid-cathode and the plate-grid fortuitous tube capacities. Control signal may be supplied to the tube input from the source 8 in the manner shown. The small inductances 7 may be placed in series with the grid leads in accordance with the method of my present invention for the purpose hereinafter to be described. The plates of the tubes may be connected to the end 9 of a transmission line 10 whose electrical length is equal to an odd number of quarter wave lengths of the carrier signal, according to the disclosure of my said prior application. To the other end of this line may be connected the source of carrier frequency signal 13 and the load 15, by the means 14 and 16 which, according to the methods of the said prior application, may be transmission lines, or the connections may be made in any other manner which is both desirable and convenient. In Fig. 1 a return path 17 is provided for D. C. rectification products between the cathodes 4 of the tubes 1 and the center tap of an inductance 18 shunting the end 11 of the transmission line 10, which functions in the manner described in the said prior application. It will be noted further that a capacitance 12 is shown in Fig. 1 which may be shunted across the end 11 of the transmission line 10, and which is provided in accordance with the present invention for a purpose to be described later.

Considering now the inductances 7, it will be seen that each is a component of a series-parallel circuit comprising the parallel combination of the inductance 7 and the grid-cathode capacitance 5 in series with the plate-grid capacitance 6. If the value of the inductance 7 is small, as it should be in the practice of the invention, the impedance of the capacitance 5 to currents of carrier frequency will be large by comparison with the impedance of the inductance, and the equivalent circuit reduces to the series combination of the inductance 7 with the capacitance 6 in which the impedance of the condenser is larger than that of the inductance. The modulating signal source will usually present negligible impedance. Hence, because of the net capacitive reactance presented by the series circuit comprising 6 and 7, the current, which is substantially the same in both 6 and 7, will lead the high frequency plate voltage by 90°. However the voltage across 7 leads this same current by 90° and hence leads the high frequency plate voltage by 180°. It will be noted that, although the tubes 1 are alternatively conductive, current of carrier frequency flows in the circuit comprising the elements 5, 7, 7, 6 throughout the entire cycle. Thus the combination functions as a phase-inverting voltage-divider shunted between the plate of the tube and its cathode, and tends to build up a voltage of carrier frequency between the grid 3 and the cathode 4 which is substantially 180° out of phase with the carrier frequency voltage impressed between the plate 1 and the cathode 4 of the tube, via the transmission line 10 and the return path 17, by means of the source 13. The magnitude of this voltage will depend, of course, upon the magnitude of the inductance 7 as compared with that of the capacitance 6, but it will be apparent that the inductances may be chosen so as to impress upon the grids of the tubes a carrier frequency voltage equal to $$-\frac{1}{\mu}$$

times the carrier frequency plate voltage, where $\mu$ is the so-called amplification factor of the tube. This condition will obtain when:

$$X_L = \frac{X_c}{1+\mu}$$

where $X_L$ is the reactance of the inductance 7 and $X_c$ the reactance of the capacitance 6, both at carrier frequency. It will be apparent that the inductance 7 will be very small as has already been intimated. In fact, in practicing the invention it has been found convenient to obtain this inductance by altering the dimensions of the grid leads. This may involve a reduction in the diameter and/or a lengthening of the leads.

Figure 1A:
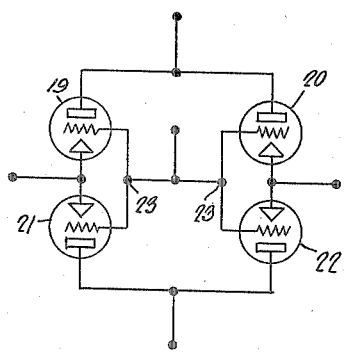
Figs. 1A and 1B are schematic diagrams showing a specific arrangement of the modulating tubes and the manner in which the grid leads may be arranged according to the method of the invention.
Figure 1B:
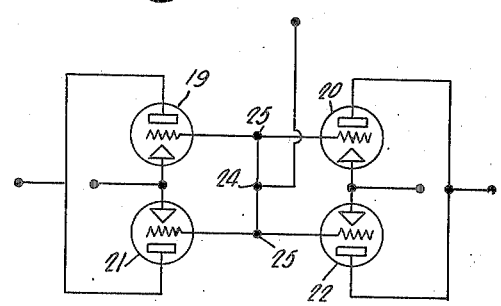

In practice, this might be done by simply changing the arrangement of the leads without moving the tubes themselves. Figs. 1A and 1B show how this might be accomplished. In Fig. 1A the tubes 19 and 20 are connected to operate in parallel as are also the tubes 21 and 22. The two pairs of tubes are in turn so connected as to operate in push pull so that they correspond to the tubes 1 of Fig. 1. Obviously, the only inductance appearing between the grids and the cathodes, irrespective of any which may be introduced by the source of modulating signal, is that presented by the short sections of lead between the points 23 and the grids of the tubes. Without changing the positioning of the tubes and by reconnecting them as shown in Fig. 1B so that the tubes 19 and 21 are in parallel as are also 20 and 22, the inductance in each grid cathode circuit is increased by the length of the lead between the points 24 and 25. This change has been found to be sufficient to produce the desired result.

In order to fully understand the nature of the change in the operation of the tubes effected by this change, it will be desirable to refer first to Fig. 2 and then successively to Figs. 3, 4, and 5. In Fig. 2 the line OBC represents the plate characteristic for one of the tubes 1 of Fig. 1 before the introduction of the regeneration resulting from the use of the inductances 7. This is the characteristic corresponding to a constant voltage $e_g$ applied to the grid. The portion of the curve between B and C corresponds to values of plate voltage greater than the grid voltage. For values of plate voltage less than the grid voltage, the plate current will be assumed to be linearly related to the plate voltage following the so-called diode line OB. The line ODE represents the modified characteristic obtained for the tube when regeneration is introduced by means of the inductance 7. Thus the two lines OBC and ODE represent the plate characteristics corresponding to the same value of instantaneous modulating voltage before and after the introduction of regeneration respectively.

By applying the same transformation to a complete family of plate characteristics, as shown in Fig. 3A, it may be converted into the corresponding family for the case of regeneration, as shown in Fig. 3B. The numbers used to designate individual characteristics represent, in both cases, instantaneous modulating voltage applied to the grid measured in arbitrary units. The characteristics of Fig. 3A are for equally spaced values of instantaneous modulating voltage and the like numbered curves in Fig. 3B correspond to the same modulating voltages and are likewise equally spaced. It will be noted that the transformation has the effect of rotating the curve for zero modulating voltage until it coincides with the $e_p$ axis of Fig. 3B and that the curves corresponding to negative values of grid voltage vanish in Fig. 3B.

In order further to analyze the behavior of the device of the invention and to compare it with prior modulating systems, it is desirable to derive from the curves of Fig. 3 those shown in Fig. 4 which give the fundamental component of plate current plotted against the peak value of plate voltage for various equally spaced values of instantaneous modulating voltage, when it is assumed that the carrier frequency voltage supplied to the plates of the modulating tubes is in the form of a sine-wave. In this case, the voltage applied to the plate of each tube will be in the form of a half-sine wave and the results obtained in the cases corresponding to no regeneration and regeneration are different and are represented respectively by the curves of Fig. 4A and Fig. 4B. A certain similarity will be observed between these curves and those for the ordinary pentode audio-frequency amplifier. The analogy is a useful one since, inasmuch as the performance of the audio frequency amplifier may be determined by superimposing a load line upon the plate characteristic and plotting plate current versus grid voltage corresponding to various points on the load line, likewise the performance of the modulating tubes may be determined by superimposing a load line on the characteristics of Fig. 4 and plotting the magnitude of the fundamental component of plate voltage versus grid voltage corresponding to points on the load line. Equal values of load resistance have been assumed in both the non-regenerative and the regenerative cases, and the corresponding load lines are indicated by the broken lines in Figs. 4A and 4B. The resulting curves which indicate the performance in the two cases are shown in Fig. 5 where curve $a$ corresponds to the case in which no regeneration is employed and curve $b$ to the case in which regeneration is employed according to the method of my invention. It will be noted that, whereas in the case of the audio amplifier D. C. is supplied to the plate, in the present case the plate supply is of carrier frequency.

As will be apparent from Fig. 4B the modulator tubes may be regarded as a generator of the side band signals and have a constant current characteristic when considered from this point of view. On this basis the modulator tubes absorb some energy derived from the fundamental signal and also convert some energy to supply the side band signals.

The various advantages arising from an application of the invention will be apparent from an observation of the curves of Fig. 5. In the case corresponding to curve $a$ in which no regeneration is used, it is necessary to swing the modulating voltage negative by an amount almost equal to that of the maximum positive swing, in order to cause the tube to cut off and thus to obtain maximum efficiency. When this is done distortion will be introduced by the bend in the lower portion of the curve. In the case corresponding to the curve $b$, however, the modulating voltage need be swung only to zero in order to cut off the tube and it will be noted further that the total swing required is approximately one-half that required in the case of no regeneration. Furthermore the amount of distortion which will be introduced, particularly for low values of modulating voltage, is much smaller than in the case of no regeneration, since the curve $b$ is substantially linear over its entire lower portion. The distortion which does occur will hence obtain only for the peaks of modulating voltage and, if the system is to be employed in a television transmitter of the type employing what is commonly designated as negative modulation, the deleterious effects of this distortion will be reduced to a minimum since those values of modulating voltage for which distortion results will correspond to that portion of the modulating signal which contains the synchronizing signal. In practice this component of the signal may be substantially periodic and may comprise a series of pulses of equal amplitude, all of which will be modified in the same degree by the non-linearity so that their usefulness will not be affected. On the other hand, the lower and substantially linear portion of the characteristic will be reserved for the video component of the signal for which high fidelity modulation is essential in order that an accurate reproduction may be obtained of the scene televised.

A further advantage arises from the fact that the method of the invention permits the use of a signal of lower amplitude on the grids of the modulator tubes than would otherwise be used. This results in a saving in power which is further enhanced by the more efficient operation of the modulating signal amplifiers when higher load impedances are used. Such operation is permitted by the fact that the grid input capacity is lower in the present system than in previous systems and hence the larger load impedances may be introduced without reduction in band width.

Although it appears to be desirable to employ values for the inductances 7 of Fig. 1 which will build up a voltage on the grids of the tubes equal to $-e_p$ it will be seen that the invention is not restricted to the use of such values of inductance. Other values may be used which will give greater or less regeneration with corresponding effects upon the tube performance, the effect being to change the value of control signal for which the tubes dissipate no energy.

Another feature of the invention which tends further to improve the operation of energy absorption devices of the class under consideration is exemplified by the condenser 12 shunting the end 11 of the transmission line 10 of the embodiment of Fig. 1. In my prior application the entire absorption circuit, comprising in the embodiment of Fig. 1 all of the apparatus illustrated to the left of the load point 11, is considered as a controllably variable conductance shunted across the said load point and it is desirable that this conductance appear as a pure conductance. If this condition does not obtain, frequency modulation may result which is generally undesirable. In my aforementioned application various means were disclosed for avoiding the effect of the interelectrode capacities of the modulator tubes which tend to introduce a susceptance component. Among these was the method of shortening the length of the modulator line 10 to throw an inductive reactance across the tube capacity so as to tune it out for the carrier frequency. Actually, in the absence of the condenser 12 or of some other equivalent means, the admittance presented to the load point 11 by the absorption circuit will not be a pure conductance but will include a susceptance component due to the fact that the termination of the line 10 at the end 9 is in part a capacitance comprising the plate-grid and grid-cathode capacities and other fortuitous capacities, the total effect of which may be considered as equivalent to shunting the end 9 of the line by a condenser.

It will, of course, be understood that although an actual physical capacitance 12 has been indicated as shunted across the load point 11 in Fig. 1, any method may be used which produces the same effect. For example, it is well known that transmission lines of various electrical lengths behave in the same manner as lumped parameters or as a combination thereof, at a particular frequency. Thus a line open circuited at its far end behaves like a capacitance when viewed from its near end if its electrical length is less than a quarter wave length. If its length is equal to a quarter wave length it behaves as a tuned circuit and if its length is greater than a quarter wave length it behaves as an inductance. Such a line of the proper dimensions attached across the line 10 at the point 11 supplemented by the proper shortening of the line 10 would achieve the desired result.

Another alternative is to lengthen the line 14 to the carrier frequency source which according to the disclosure of my prior application has an electrical length equal to an odd number of quarter wave lengths of the carrier frequency and to place inductances in the connections to the source which will cause a capacitive reactive component to be reflected across the load point 11. If the proper values of inductance are used and if, as before, the length of the line 10 is reduced the reactive component of the energy absorption circuit will be neutralized.

Still another possibility is available in the case when a quarter wave line or other impedance inverter is used to transform the impedance of the load. If the impedance of the load is less than the characteristic impedance of the inverter, the inverter may be modified in a manner which will occur to those skilled in the art so that the impedance presented to the load point is such as to neutralize the reactive component of the energy absorptive device. The length of the line 10 may also be shortened.

In certain cases it may be sufficient merely to shorten the length of the line, there being sufficient fortuitous capacity introduced by the junction of the three lines to the modulator tubes, to the carrier frequency source, and to the load to accomplish the desired result. Other methods of accomplishing the result will occur to those skilled in the art, which are within the scope of the invention as defined by the following claims.

I claim:

1. In a modulating system; a source of wave energy of carrier frequency; signal utilization means supplied with energy from said source; a controllable modulating impedance connected to said utilization means, said modulating impedance comprising an impedance inverter and a space discharge device, said space discharge device having an input circuit and an output circuit and having its output circuit connected to said impedance inverter; a source of a modulating signal connected to the input circuit of said space discharge device; and means for causing a signal of the same frequency but opposite in phase to the signal in the output circuit of said space discharge device to be built up in the input circuit of said space discharge device.

2. In a modulating system; means for dissipating energy at a rate variable in response to a modulating signal applied to its input, said means including a space discharge device having an input circuit and an output circuit; a source of a modulating signal coupled to the input circuit of said space discharge device for controlling the energy dissipation therein; an impedance inverter having an input circuit and an output circuit and having its input circuit coupled to the output circuit of said space discharge device for forming an impedance substantially inversely proportional to the effective impedance of said dissipative means for wave signals within a certain high frequency range; a source of wave energy of a frequency within said range coupled to the output circuit of said impedance inverter; means for deriving from said last-mentioned source a signal of the same frequency but opposite in phase to the signal in the output circuit of said space discharge device; and means for applying said derived signal to the input circuit of said space discharge device.

3. In a modulating system; means for dissipating energy at a rate variable in response to a modulating signal applied to its input, said means comprising a plurality of space discharge devices each having an input circuit and an output circuit; a source of modulating signal coupled to the input circuits of said space discharge devices for controlling the energy dissipation therein; an impedance inverter having an input circuit and an output circuit and having its input circuit coupled to the output circuits of said space discharge devices for forming an impedance substantially inversely proportional to the effective impedance of said dissipative means for wave energy within a certain high frequency range; a source of wave energy of a frequency within said range coupled to the output circuit of said impedance inverter; means for deriving from said last-mentioned source a signal of the same frequency but opposite in phase to the signal in the output circuits of said space discharge devices; and means for applying said derived signal to the input circuits of said space discharge devices.

4. In a modulating system; means for dissipating energy at a rate variable in response to a modulating signal applied to its input, said means comprising a plurality of space discharge devices each having an anode, a cathode, and a control grid; a coupling between said cathodes; a source of a modulating signal coupled to the grids of said space discharge devices for controlling the energy dissipation therein; an impedance inverter having an input circuit and an output circuit and having its input circuit coupled to the output circuits of said space discharge devices for forming an impedance substantially inversely proportional to the effective impedance of said dissipative means for wave energy within a certain high frequency range; a source of wave energy of a frequency within said range coupled to the output circuit of said impedance inverter; means for deriving from said last-mentioned source a signal of the same frequency but opposite in phase to the signal appearing on the anodes of said space discharge devices; and means for applying said derived signal to the grids of said space discharge devices.

5. In a modulating system; means for dissipating energy at a rate variable in response to a modulating signal applied to its input, said means comprising a plurality of space discharge devices each having an input circuit and an output circuit; a source of a modulating signal coupled to the input circuits of said space discharge devices for controlling the energy dissipation therein; an impedance inverter having an input circuit and an output circuit and having its input circuit coupled to the output circuits of said space discharge devices for forming an impedance substantially inversely proportional to the effective impedance of said dissipative means for wave energy within a certain high frequency range; a source of wave energy of a frequency within said range coupled to the output circuit of said impedance inverter; and means including inductances connected between the grids and cathodes of said space discharge devices for deriving from said last-mentioned source a signal of the same frequency but opposite in phase to the signal in the output circuits of said space discharge devices and for applying said derived signal to the input circuits of said space discharge devices.

6. In a modulating system; means for dissipating energy at a rate variable in response to a modulating signal applied to its input, said means comprising a plurality of space discharge devices each having an input circuit and an output circuit; a source of a modulating signal coupled to the input circuits of said space discharge devices for controlling the energy dissipation therein; an impedance inverter having an input circuit and an output circuit and having its input circuit coupled to the output circuits of said space discharge devices for forming an impedance substantially inversely proportional to the effective impedance of said dissipative means for wave energy within a certain high frequency range; a source of wave energy of a frequency within said range coupled to the output circuit of said impedance inverter; means for deriving from said last-mentioned source a signal of the same frequency but opposite in phase to the signal in the output circuits of said space discharge devices; and means for applying a portion of said derived signal to the input circuit of each of said space discharge devices, the magnitude of the signal applied to each of said space discharge devices being equal to the magnitude of the signal in its output circuit multiplied by the reciprocal amplification factor of said space discharge device.

7. In an absorption modulating system; a source of high frequency signals; an output impedance coupled to said high frequency signal source; and means coupled to said high frequency signal source for controllably dissipating electrical energy therefrom to thereby vary continuously the amplitude of the output signal, said means comprising controllable space discharge means for dissipating electrical energy and for providing an inherent capacitive reactance; an impedance-inverter comprising a transmission line having one end coupled to said space discharge means; means for providing a capacitive reactance coupled to the other end of said line, said line and both of said capacitive reactances cooperatively forming an effective transmission line having an electrical length substantially equal to an odd number of quarter wave lengths of a wave signal having a frequency within a certain frequency range including the frequency of said high frequency signal, thus forming a modulating impedance substantially inversely proportional to the effective impedance of said space discharge means for wave signals having a frequency within said certain frequency range; and a source of a modulating signal for controlling said space discharge means, the amplitude of said modulating signal varying within certain limits such that, for particular values of said modulating signal, the energy dissipated by said dissipative means is comparable in amount to that transferred to said output impedance, while for maximum and minimum valves of said modulating signal the energy dissipated by said dissipative means is considerably less.

WILLIAM NELSON PARKER.